US006024313A

United States Patent [19]

Kameoka

[11] Patent Number: 6,024,313

[45] Date of Patent: Feb. 15, 2000

[54] DEVICE FOR PULLING FILM TIP FROM PATRONE

[75] Inventor: Masanao Kameoka, Wakayama, Japan

[73] Assignee: Noritsu Koki Co., Ltd., Wakayama, Japan

[21] Appl. No.: 08/922,465

[22] Filed: Sep. 3, 1997

[30] Foreign Application Priority Data

Sep. 9, 1996 [JP] Japan .................................... 8-237930

[51] Int. Cl.$^{7}$ ....................................................... G03B 1/58

[52] U.S. Cl. .................................... 242/332.2; 242/332.4; 242/598.1

[58] Field of Search ............................. 242/598.1, 332.1, 242/332.2, 332.4; 396/415

[56] References Cited

U.S. PATENT DOCUMENTS 4,113,192 9/1978 Osanai ............................. 242/332.4 X
4,138,068 2/1979 Kinoshita ......................... 242/332.4 X
4,381,083 4/1983 Tsunetsugu .......................... 242/598.1

*Primary Examiner*—John Q. Nguyen
*Attorney, Agent, or Firm*—Wenderoth, Lind & Ponack, L.L.P.

[57] ABSTRACT

A film tip pulling device which can automatically and reliably pull out the tip of film wound in a patrone. A pair of holder arms are provided on both sides of a case to resiliently sandwich a patrone from both ends thereof. A film tip pulling plate is slidably inserted in a guide groove open at the front side of the case. A guide plate is provided to guide a film being pulled into a space under the tip of the film tip pulling plate into the guide groove. With a patrone set between the front portions of the holder arms and the film tip pulling plate and the guide plate inserted into the patrone through its film inlet/outlet, a motor in the case is activated to reciprocate the film tip pulling plate through a crank mechanism. When the film tip pulling plate retracts, protrusions of the film tip pulling plate engage perforations formed in the film. The film is thus pulled out. When a film tip sensor provided in the case detects the tip of the film, the motor is deactivated.

3 Claims, 8 Drawing Sheets

DEVICE FOR PULLING FILM TIP FROM PATRONE

BACKGROUND OF THE INVENTION

This invention relates to a film tip pulling device for pulling out the leading end of a rolled film in a patrone through its inlet/outlet.

Exposed film in a patrone is pulled back into the patrone. To develop the film, the patrone is set in an automatic developing device with the tip of the film pulled out of the patrone through its inlet/outlet.

Unexamined Japanese patent publication 4-120537 discloses a method of pulling a film out of a patrone through its inlet/outlet. In this method, the film winding spool provided in the patrone is rotated in the direction opposite to the film take-up direction to push the film tip out of the patrone through the film inlet/outlet.

In the arrangement disclosed in Examined Japanese utility model publication 55-16265, the film tip is pulled out by inserting a film puller into the patrone through its film inlet/outlet.

In the arrangement disclosed in unexamined Japanese patent publication 55-35353, tips of first and second film pulling plates are inserted into a patrone through ts film inlet/outlet; the first pulling plate is inserted into the patrone by rotating the spool of the patrone in the film take-up direction; the spool is stopped upon detection of a sound produced when the film tip passes the tip of the second pulling plate; the spool is rotated in the film unwinding direction thereafter; the film is sandwiched between the first and second pulling plates, and the film tip is pulled out by pulling out both pulling plates simultaneously.

The method in which the film tip is pulled out by rotating the spool in the unwinding direction can be used advantageously for film patrones having the function of pulling out the film tip, such as those disclosed in unexamined Japanese patent publication 2-124564 and U.S. Pat. No. 4,423,943. But, for patrones having no such function, it is difficult to pull the film out of the patrone through its inlet/outlet due to a curling tendency of the film because the film is stored in a rolled state.

In the method in which a film puller is used, the film tip has to be pulled out manually. Thus, this method is inefficient and less reliable. There is also the possibility of excessively pulling out the film.

An object of this invention is to provide a film tip pulling device which can automatically pull out the tip of film wound in a patrone only by a necessary length with high reliability without the need to rotate the spool or detect any sound.

SUMMARY OF THE INVENTION

According to this invention, there is provided a film tip pulling device for pulling a film tip out of a patrone comprising a case formed with a guide groove open at front side thereof, a patrone holder for holding the patrone in front of the case, a flexible film tip pulling plate insertable into a film inlet/outlet of a patrone and having its rear end slidably inserted in the guide groove, the film tip pulling plate being provided at its tip on both sides thereof with protrusions engageable with perforations formed in the film wound in the patrone along both side edges thereof, a guide plate provided under the tip of the film tip pulling plate for guiding the tip of the film pulled out of the patrone into the guide groove, a motor mounted in the case, a motion converting means mounted in the case for converting the rotation of a rotary shaft of the motor into reciprocating motion of the film tip pulling plate, and a film tip sensor mounted in the case for detecting the tip of film, the motor being adapted to be deactivated when the film tip sensor detects a film tip.

The patrone holder may comprise a pair of holder arms pivotably mounted on both sides of the case, each of the holder arms having a front portion protruding forwardly from the front end of the case, each of the front portion being formed with a forwardly downsloping guide groove in an inner surface thereof so as to received each and of the patrone, and springs for biasing the holder arms to close their front portions.

The motion converting means may be a crank mechanism or a rack-and-pinion mechanism.

The motor may be powered by a battery mounted in the case. A switch may be provided near the closed end of the guide grooves to activate the motor when the ends of a patrone are inserted into the guide grooves.

The film tip pulling plate has near its tip a hole into which the tip of the guide plate is adapted to be inserted by its own resilience when the film tip pulling plate is in a retracted position so that the film tip pulling plate and the guide plate can be smoothly inserted into the patrone through its film inlet/outlet.

Other features and objects of the present invention will become apparent from the following description made with reference to the accompanying drawings, in which:

DETAILED DESCRIPTION OF THE PREFERRED EMBODIMENT

An embodiment of the invention is described with reference to the accompanying drawings.

Figure 1:
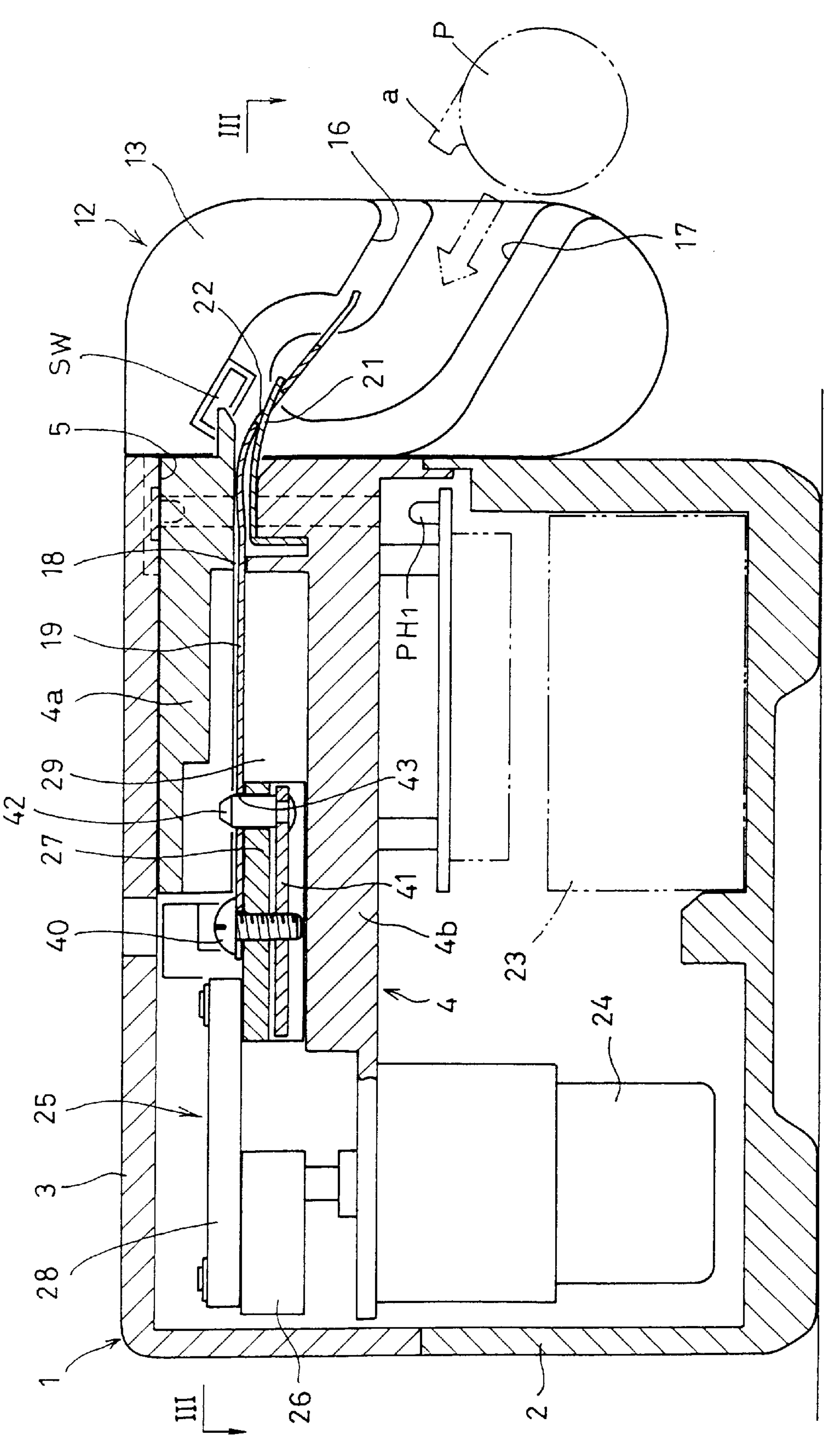
FIG. 1 is a vertical sectional front view of an embodiment of this invention.
Figure 4:
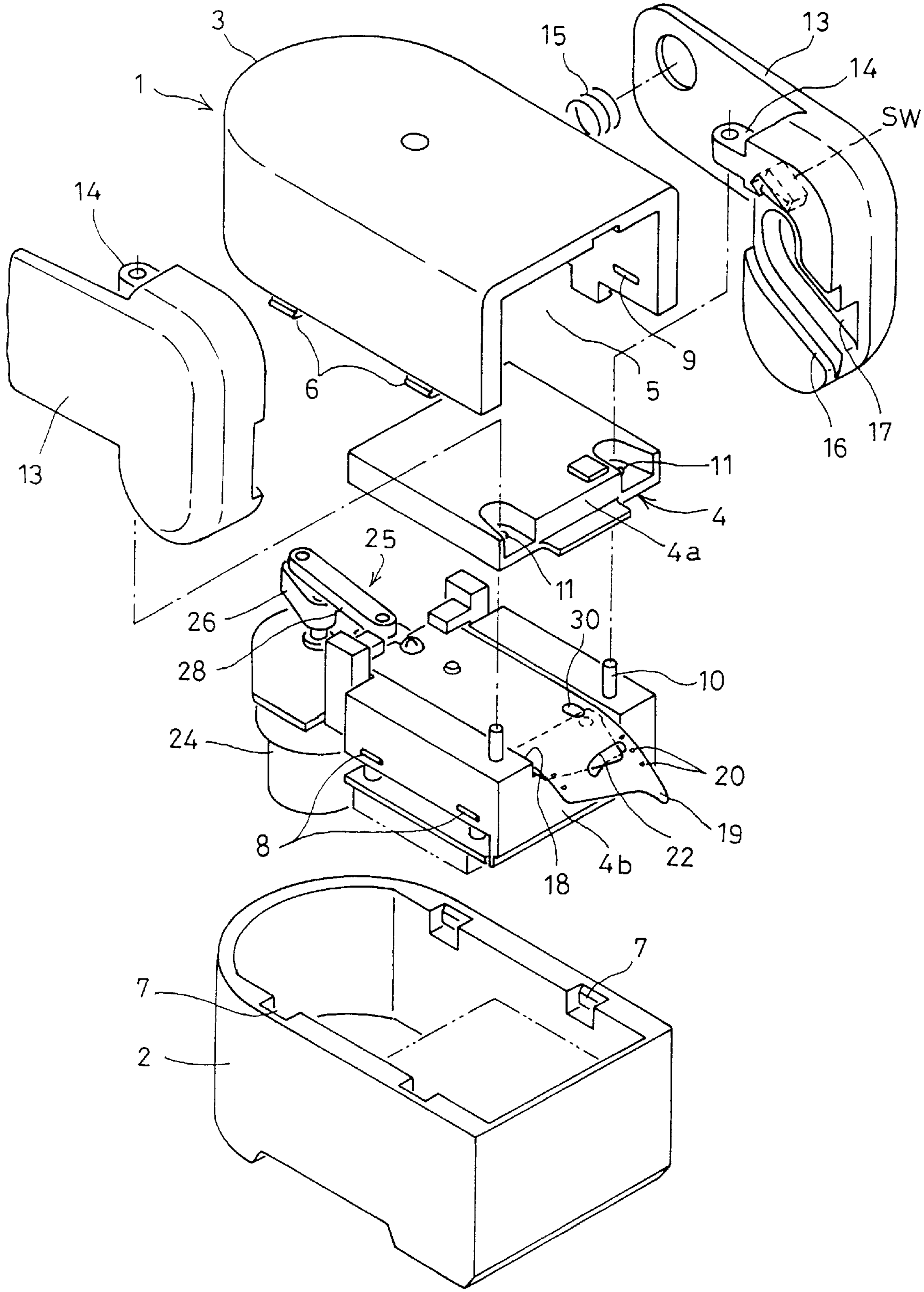
FIG. 4 is an exploded perspective view of the invention.

As seen in FIGS. 1 and 4, a case 1 comprises a case bottom 2, a cover 3 and a guide block 4. The cover 3 has an opening 5 in the front side and is provided on the bottom of its side walls with a plurality of protrusions 6.

The protrusions 6 are engageable in recesses 7 formed in the inner surface of the case bottom 2 along its top edge. By engaging the protrusions 6 in the recesses 7, the cover 3 is joined to the case bottom 2.

The guide block 4 fits in the opening 5 of the cover 3. It is provided on both sides thereof with projections 8 engageable with grooves 9 formed in the inner surfaces of the side walls of the cover 3 to hold the guide block 4 in engagement with the cover 3.

The guide block 4 is split into an upper block 4*a* and a lower block 4*b*. Two pins 10 provided on both sides of the top surface of the lower block 4*b* are inserted in pin holes 11 formed in the upper block 4*a*.

Figure 2:
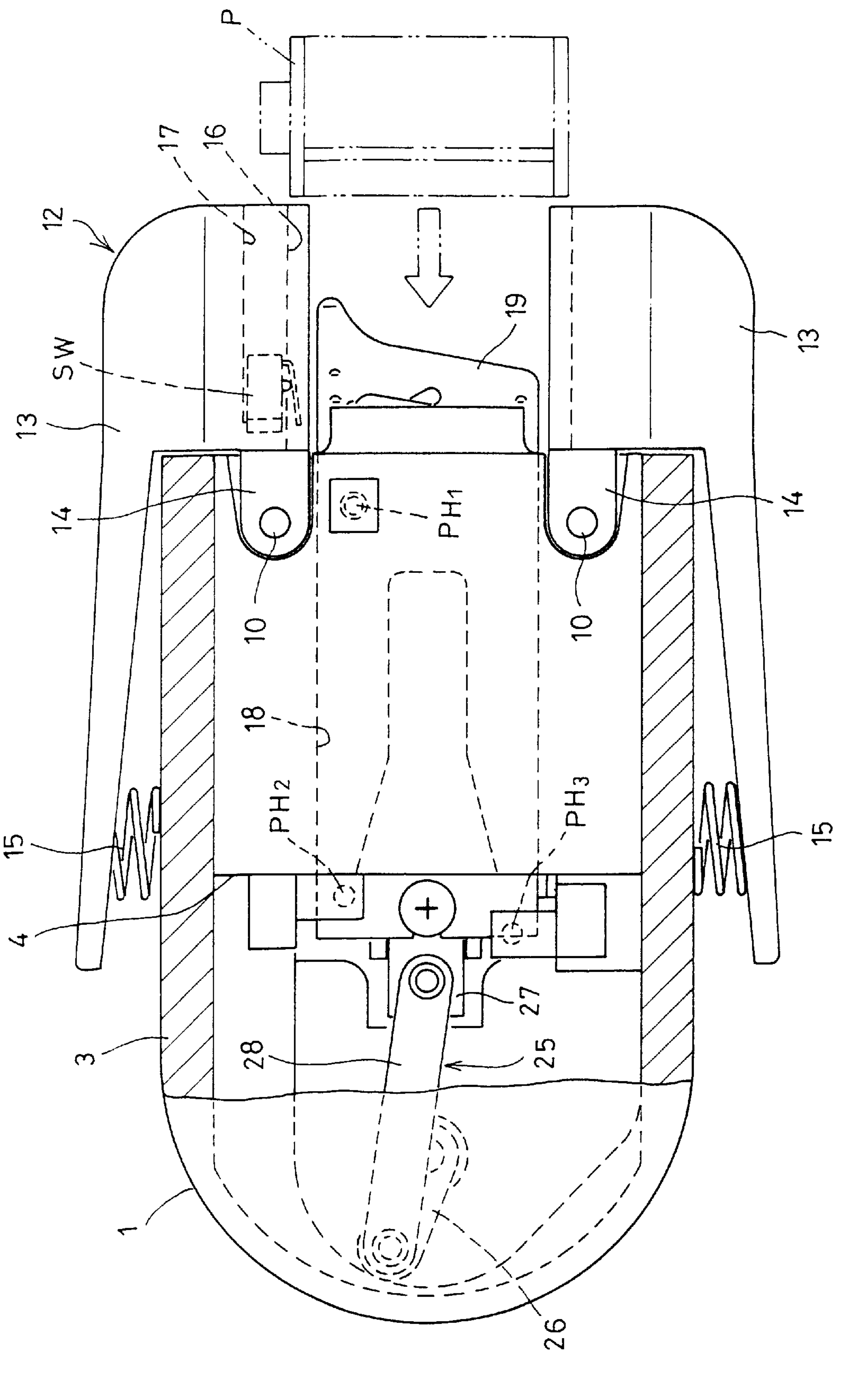
FIG. 2 is a partially cutaway plan view of the invention.
Figure 3:
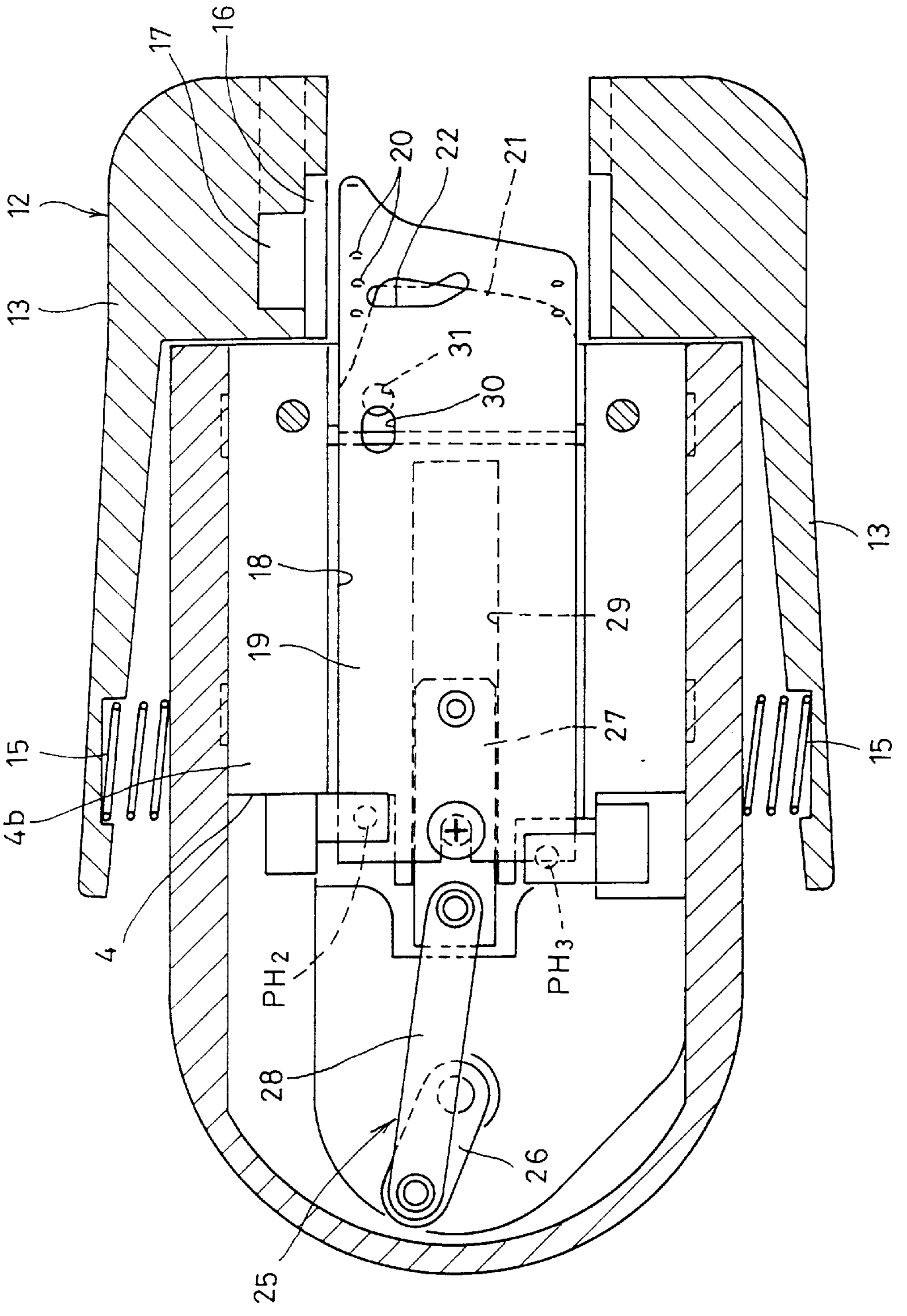
FIG. 3 is a sectional view taken along line III—III of FIG. 1.

As shown in FIGS. 2 to 4, a patrone P is held by a patrone holder 12 in front of the case 1. The patrone holder comprises a pair of holder arms 13 provided on both sides of the case 1. Each holder arm 13 is provided on its inner surface with a protrusion 14 rotatably supported by the respective pin 10 formed on the lower block 4*b*.

Springs 15 are disposed between the rear portions of the holder arms 13 and the side walls of the cover 3. The springs 15 bias the front portions of the holder arms 13 protruding forwardly from the case toward each other. A space is formed between the holder arms to receive the patrone such that the space and the patrone share a common axis. A patrone P is thus resiliently sandwiched at its ends by the front ends of the holder arms 13 in the space.

Each holder arm 13 has in the inner surface at its front end a guide groove 16 in which a respective end of patrone P fits. The guide grooves 16 slope downward toward the front ends of the arms 13. The patrone P has a spool S having one end thereof protruding through one end plate thereof. To receive this protruding end of the spool, a second groove 17 is formed in one of the guide grooves 16.

As shown in FIGS. 3 and 4, the lower block 4*b* of the guide block 4 has on the top surface thereof a guide groove 18 extending from front to back. A flexible, thin film tip pulling plate 19 has its rear end slidably inserted in the guide groove 18.

The film tip pulling plate 19 is narrow enough to be insertable into a patrone P through its film inlet/outlet a. Near its tip, the film tip pulling plate is inclined in the same direction as the guide grooves 16.

Also, the film tip pulling plate 19 has its front edge inclined from one side toward the other side so as to be easily insertable into the patrone (FIG. 2).

Figure 8:
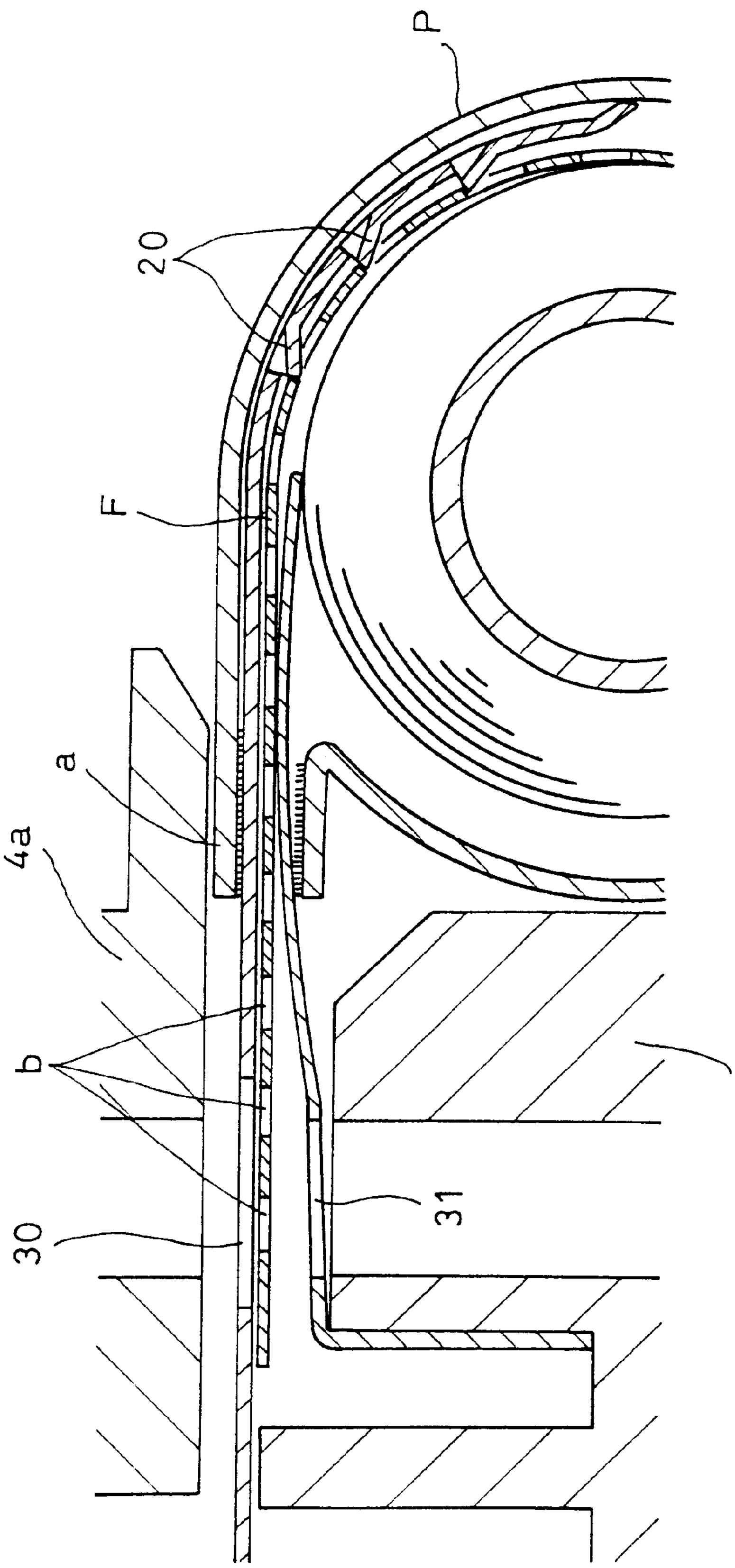
FIG. 8 is a sectional view with protrusions engaged in perforations.

As shown in FIGS. 3 and 8, a plurality of protrusions 20 are provided near the edges of the film tip pulling plate 19 near its tip. The protrusions 20 are engageable with perforations b formed along the side edges of the film F wound in the patrone P. The protrusions 20 are inclined in one direction so that they engage perforations b when the film tip pulling plate 19 is inserted into the patrone P through the film inlet and then pulled out, and disengage therefrom when the plate 19 is inserted again into the patrone P.

As shown in FIGS. 1 and 3, a flexible, thin guide plate 21 is provided under the tip of the film tip pulling plate 19. The guide plate 21 is fixed to the lower block 4*b* with its rear end inserted in the guide groove 18 formed in the lower block 4*b* to guide the tip of the film F being pulled out by the film tip pulling plate 19 into the guide groove 18.

The guide plate 21 has its tip inclined downward at an angle smaller than the inclination angle of the tip of the tongue pulling plate 19 and has its front edge partially inserted in a hole 22 formed in the film tip pulling plate 19 near its tip.

Referring to FIG. 1, mounted in the case 1 are a battery 23, a motor 24 powered by the battery 23, and a motion converter 25 for converting the rotation of the shaft of the motor 24 into reciprocating motion of the film tip pulling plate 19.

Instead of the battery 23, a home AC power source may be used to drive the motor 24.

The motion converter 25 comprises a crank mechanism comprising a crank arm 26 connected at one end thereof to the rotary shaft of the motor 24, a coupling piece 27 coupled to the film tip pulling plate 19, and a link 28 coupling the other end of the crank arm 26 to the coupling piece 27. Referring to FIG. 1, the coupling piece 27 carries a screw 40. By turning the screw 40, a support plate 41 is raised, so that a pin 42 provided on the plate 41 is inserted into a hole 43 formed in the film tip pulling plate 19. The coupling piece 27 is thus coupled to the plate 19 and slidably inserted in a groove formed in the bottom of the guide groove 18.

FIGS. 1 and 3 show a standby position of the film tip pulling plate 19. This standby position is the position slightly before the rearmost position of the plate 19. In the standby position, a hole 30 formed in the film tip pulling plate near its tip partially communicates with a hole 31 formed in the guide plate 21. A film tip detection sensor PH1 which comprises a light emitter and a light receptor is provided over and under the holes 30 and 31 when they communicate with each other.

Inside the case 1, a first and a second sensor PH2 and PH3 for detecting the rear end of the film tip pulling plate 19 are provided slightly displaced from each other. When the first sensor PH2 detects the rear end of the film tip pulling plate 19 and the film tip detection sensor PH1 detects the tip of the film F, the motor 24 is deactivated. The motor 24 is kept deactivated for a predetermined time period and then restarted. When the second sensor PH3 detects the rear end of the film tip pulling plate 19 thereafter, the motor 24 is stopped gain, holding the plate 19 in the standby position.

In operation, to pull out the tip of a film F in a patrone P, the holder arms 13 shown in FIG. 2 are pressed at their rear ends from both sides to move the front ends of the arms 13 away from each other. In this state, the patrone P is inserted into the space between the front ends of the arms 13 to fit both ends of the patrone P in the guide grooves 16.

Figure 5:
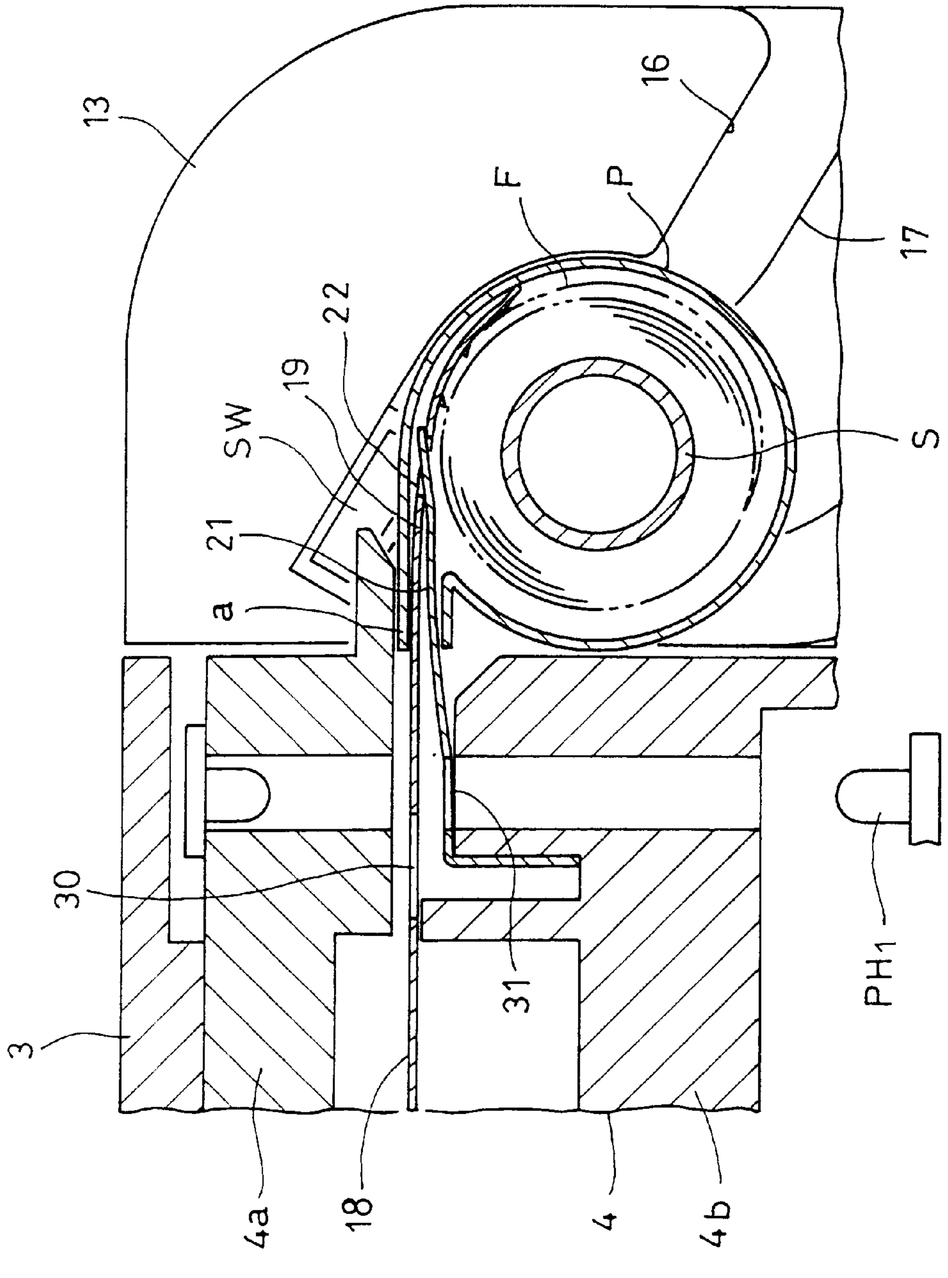
FIG. 5 is a sectional view with a patrone set in position.

When the patrone P is inserted in the space between the holder arms 13 with its film inlet first, the film tip pulling plate 19 and the guide plate 21 are inserted into the film inlet as shown in FIG. 5. Since the guide plate 21 has its front edge partially inserted in the hole 22, the guide plate 21 smoothly enters the film inlet when the tip of the film tip pulling plate is inserted into the film inlet.

When the patrone P is pushed in and abuts the closed ends of the guide grooves 16, the holder arms 13 are released. The ends of the arms 13 are thus pushed by the springs 15 toward each other to resiliently keep the patrone sandwiched from both ends.

When the patrone P is pushed in until it abuts the closed ends of the guide grooves 16, a motor activating switch SW provided at the closed end of one of the guide grooves 16 is closed.

Figure 6:
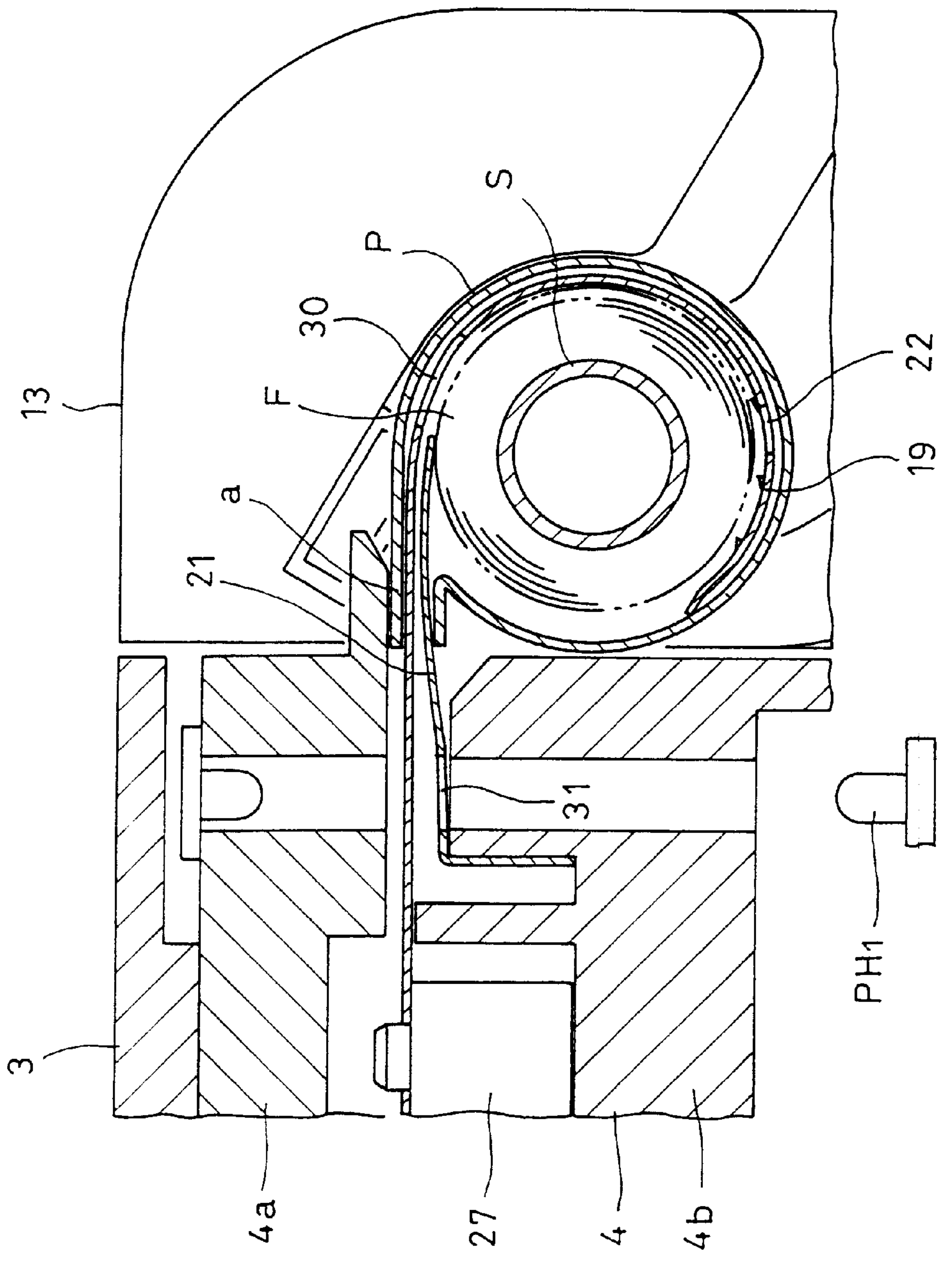
FIG. 6 is a sectional view with a film tip pulling plate advanced to the maximum.
Figure 7:
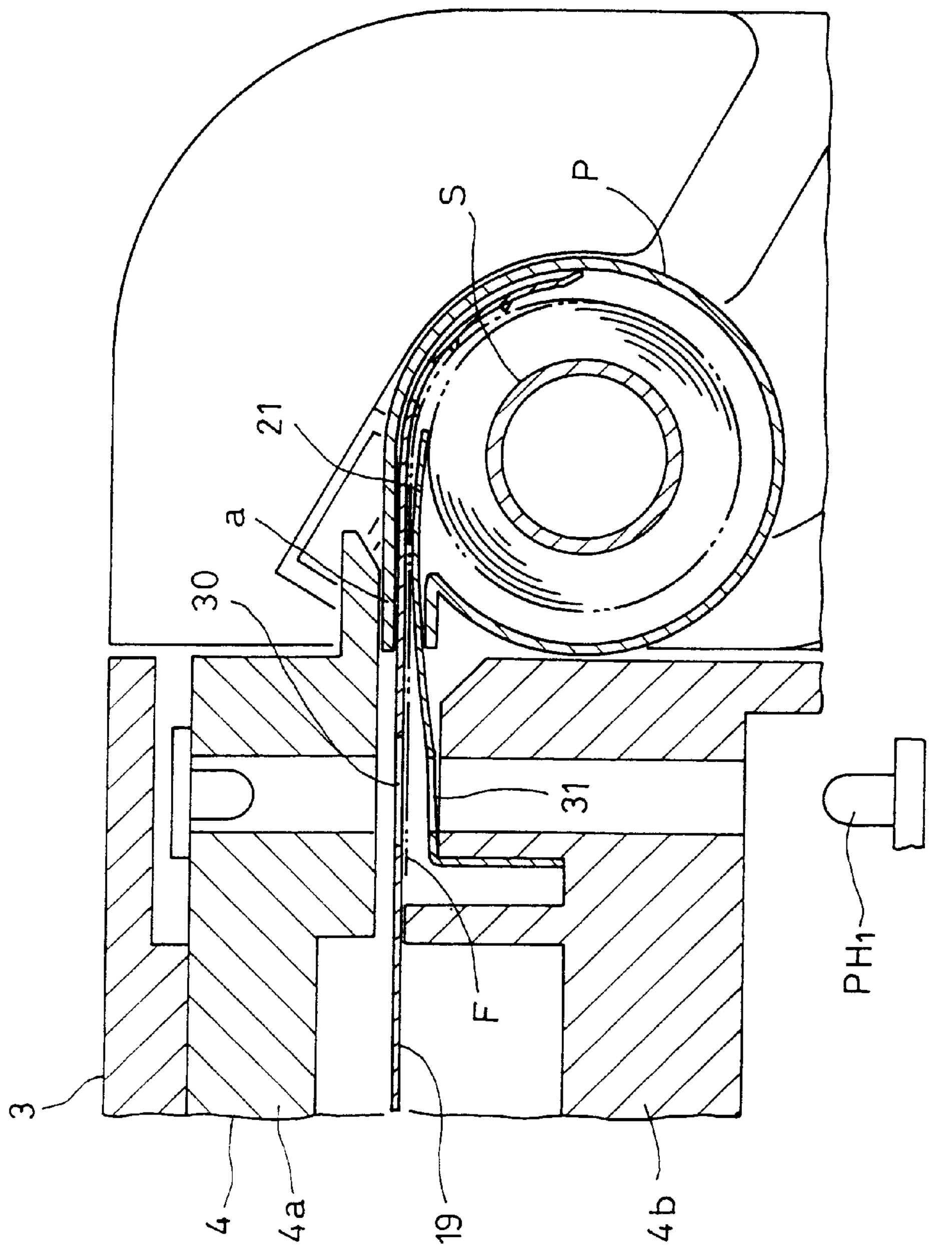
FIG. 7 is a sectional view with a film tip pulled out.

When the switch SW is closed, the motor 24 is activated, reciprocating the plate 19 by a predetermined stroke. FIG. 6 shows the most advanced position of the plate 19. In this state, the tip of the plate 19 is inserted into the patrone by the length about ⅔ of the entire circumference of the patrone P. When the film tip pulling plate 19 is retracted from this position, the protrusions 20 engage perforations b of the film F as shown in FIG. 8, so that the tip of the film F is pulled out of the patrone together with the plate 19. Even if the tip of the film tip pulling plate 19 is initially away from the tip of the film F, the roll of film F is rotated in the patrone by the plate 19 when the protrusions 20 engage perforations b of the film F, so that the protrusions 20 will eventually engage perforations b near the tip of the film as the plate 19 repeatedly reciprocates. Thus, the film end can be pulled out of the patrone.

The film tip pulling plate 19 reciprocates continuously. When it retracts, the tip of the film is pulled out of the patrone P through its film inlet. Once pulled out of the patrone, the film is guided by the guide plate 21 into the guide groove 18. When its tip is pulled to the hole 31 of the guide plate 21, the film end detection sensor PH1 detects the end of the film F.

When the film tip pulling plate 19 retracts and its rear end is detected by the first sensor PH2, the motor 24 is deactivated. In this state, the tip of the film F is pulled out of the patrone P through its inlet by a predetermined length.

After the tongue of the film has been pulled out, the patrone P is removed from the holder arms 13 by pressing their rear ends against the bias of the springs. Since the patrone is removed by sliding it along the forwardly downslope guide grooves 16, the protrusions 20 disengage from the perforations b when the patrone is removed. Thus, the film F will not be pulled out of the patrone P when the patrone P is removed from the holder arms.

Once the patrone P is removed from the holder arms 13, the motor 24 is restarted to retract the film tip pulling plate 19. When the second sensor PH3 detects the rear end of the plate 19, the motor 24 is deactivated again, holding the plate 19 in the standby position shown in FIG. 2.

When the film tip pulling plate 19 retracts to the standby position, the front edge of the guide plate 21 is partially inserted into the hole 22.

As described, according to this invention, the film tip pulling plate having protrusions capable of engaging perforations formed in film along both side edges thereof is inserted into a patrone through its film inlet together with the guide plate, and reciprocated back and forth by a predetermined stroke. It is thus possible to automatically and reliably pull out the film tip wound in the patrone.

When the film tip detection sensor detects the tip of the film that has been pulled out into the case, the motor for reciprocating the tongue pulling plate is deactivated. It is thus possible to pull out the film by a predetermined length, without the possibility of the film being pulled out excessively.

The film tip pulling plate is reciprocated by the crank mechanism. It is thus possible to move the plate back and forth strongly and slowly.

According to the invention, the film tip pulling plate is formed with a hole in which the front edge of the guide plate is partially inserted when the film tip pulling plate is in the retracted position. It is thus possible to smoothly insert the film tip pulling plate and the guide plate into the patrone through its inlet.

According to the invention, the motor is powered by a battery provided in the case. Thus, the film tip can be pulled out at any desired location.

According to the invention, the motor activating switch is closed when the patrone is set. Thus, the film tip can be pulled out efficiently.

What is claimed is:

1. An apparatus for pulling a film out of a patrone, comprising:

- a case having a guide groove formed therein which opens at a front side of said case;
- a patrone holder mounted to said case and having a space configured to receive the patrone at said front side of said case, said space having an axis which is coaxial with an axis about which the patrone is intended to rotate when the patrone is received in said space;
- a flexible film tip pulling plate to be inserted into an opening of the patrone, said film tip pulling plate comprising a rear end slidably inserted in said guide groove and a tip having protrusions provided thereon such that said protrusions extend from a surface of said film tip pulling plate facing said axis of said space;
- a guide plate provided adjacent a bottom surface of said film tip pulling plate to guide a tip of the film into said guide groove;
- a film tip sensor mounted in said case to detect the tip of the film;
- a motor mounted in said case to move said film tip pulling plate, said motor having a rotary shaft and being adapted to deactivate when said film tip sensor detects the tip of the film;
- a motion converting device mounted in said case and connected to said film tip pulling plate and said rotary shaft to convert a rotation of said rotary shaft into a reciprocating motion of said film tip pulling plate;
- a pair of holder arms pivotably mounted on opposite sides of said case, each of said holder arms having a front portion protruding from said front side of said case and a forwardly downsloping guide groove formed in an inner surface of each of said holder arms to receive an end of the patrone; and
- springs to bias said front portions of said holder arms toward each other.

2. The apparatus of claim 1, further comprising:

- a switch provided proximate a closed end of one of said guide grooves of said holder arms structured to activate said motor when the patrone is received in said patrone holder.

3. An apparatus for pulling a film out of a patrone, comprising:

- a case having a guide groove formed therein which opens at a front side of said case;
- a patrone holder mounted to said case and having a space configured to receive the patrone at said front side of said case, said space having an axis which is coaxial with an axis about which the patrone is intended to rotate when the patrone is received in said space;
- a flexible film tip pulling plate to be inserted into an opening of the patrone, said film tip pulling plate comprising a rear end slidably inserted in said guide groove and a tip having protrusions provided thereon such that said protrusions extend from a surface of said film tip pulling plate facing said axis of said space;
- a guide plate provided adjacent a bottom surface of said film tip pulling plate to guide a tip of the film into said guide groove;
- a film tip sensor mounted in said case to detect the tip of the film;
- a motor mounted in said case to move said film tip pulling plate, said motor having a rotary shaft and being adapted to deactivate when said film tip sensor detects the tip of the film;
- a motion converting device mounted in said case and connected to said film tip pulling plate and said rotary shaft to convert a rotation of said rotary shaft into a reciprocating motion of said film tip pulling plate; and
- a hole formed proximate said tip of said film tip pulling plate, said hole being structured to receive a tip of said guide plate when said film tip pulling plate assumes a retracted position.

* * * * *